US009146573B2

(12) United States Patent
Park et al.

(10) Patent No.: US 9,146,573 B2
(45) Date of Patent: *Sep. 29, 2015

(54) CONTROL DEVICE AND METHOD THEREOF

(71) Applicant: SAMSUNG ELECTRONICS CO., LTD., Suwon-si (KR)

(72) Inventors: Eun-hee Park, Suwon-si (KR); Seung-dong Yu, Osan-si (KR); Woo-yong Chang, Yongin-si (KR); Ju-il Eom, Suwon-si (KR); Chang-hwan Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/038,194

(22) Filed: Sep. 26, 2013

(65) Prior Publication Data

US 2014/0032004 A1 Jan. 30, 2014

Related U.S. Application Data

(63) Continuation of application No. 12/268,758, filed on Nov. 11, 2008, now Pat. No. 8,903,563.

(30) Foreign Application Priority Data

May 27, 2008 (KR) ........................ 10-2008-0049250

(51) Int. Cl.
*G05D 3/12* (2006.01)
*G05F 1/66* (2006.01)
(Continued)

(52) U.S. Cl.
CPC *G05F 1/66* (2013.01); *H04L 12/12* (2013.01); *H04L 12/282* (2013.01);
(Continued)

(58) Field of Classification Search
CPC .......... G08C 2201/00; G08C 2201/20; G08C 2201/92; G08C 2201/93
USPC ................. 700/295; 348/14.04; 367/117, 197; 398/106; 340/12.28; 341/176
See application file for complete search history.

(56) References Cited

U.S. PATENT DOCUMENTS 7,324,168 B2 * 1/2008 Griesau et al. ................ 348/734
7,895,532 B2   2/2011 Scott et al.
(Continued)

FOREIGN PATENT DOCUMENTS

| KR | 1020060007242 A | 1/2006 |
| KR | 1020060115113 A | 11/2006 |
| KR | 10-0789487 B1 | 12/2007 |

OTHER PUBLICATIONS

Communication issued on Jan. 14, 2015 by the Korean Intellectual Property Office in related application No. 1020080049250.
(Continued)

*Primary Examiner* — Mohammad Ali
*Assistant Examiner* — Sheela S Rao
(74) *Attorney, Agent, or Firm* — Sughrue Mion, PLLC

(57) ABSTRACT

A control device which controls the power of a plurality of apparatuses in a home network, and a method thereof are provided. The control device includes an input unit which receives a power off command, and a control unit which concurrently turns off apparatuses which are currently turned on among the plurality of apparatuses in response to the power off command received by the input unit. Therefore, it is possible for a user to concurrently turn off currently running apparatuses so user convenience can increase.

13 Claims, 4 Drawing Sheets

(51) Int. Cl.
*H04L 12/12* (2006.01)
*H04L 12/28* (2006.01)
*H02J 13/00* (2006.01)
*H02J 3/14* (2006.01)

(52) U.S. Cl.
CPC ........ *H04L 12/2827* (2013.01); *H02J 13/0075* (2013.01); *H02J 2003/143* (2013.01); *H04L 2012/2849* (2013.01); *Y02B 60/34* (2013.01); *Y02B 70/325* (2013.01); *Y02B 70/3266* (2013.01); *Y02B 90/2653* (2013.01); *Y04S 20/228* (2013.01); *Y04S 20/242* (2013.01); *Y04S 40/126* (2013.01)

(56) References Cited

U.S. PATENT DOCUMENTS

2008/0042891 A1 2/2008 Rye et al.
2008/0122585 A1* 5/2008 Castaldo et al. ......... 340/286.01

OTHER PUBLICATIONS

Communication dated Jun. 20, 2014 from the Korean Intellectual Property Office in a counterpart Korean application No. 10-2008-0049250.

* cited by examiner

CONTROL DEVICE AND METHOD THEREOF

CROSS-REFERENCE TO RELATED APPLICATIONS

This application is a continuation application of U.S. application Ser. No. 12/268,758, filed Nov. 11, 2008, which claims priority from Korean Patent Application No. 10-2008-0049250, filed on May 27, 2008 in the Korean Intellectual Property Office, the disclosures of which are incorporated herein by reference in their entirety.

BACKGROUND OF THE INVENTION

1. Field of the Invention

Apparatuses and methods consistent with the present invention relate to a control device and method, and more particularly, to a control device and method which control the power of a plurality of apparatuses in a home network.

2. Description of the Related Art

When users desire to connect network connectable apparatuses to televisions, they need to separately and manually turn off each of a plurality of currently running apparatuses using remote controllers or power buttons contained in the plurality of apparatuses, which causes user inconvenience.

Additionally, when users are able to use a single remote controller capable of manipulating a plurality of currently running apparatuses, they need to change the remote control mode for each of the currently running apparatuses in order to turn off the currently running apparatuses. Accordingly, users may feel inconvenience, because they need to perform such a mode change operation as many times as there are apparatuses which they desire to turn off.

As a result of the rapid development of video and audio media technologies, various types of apparatuses are capable of being connected to home networks. Therefore, user inconvenience becomes more pronounced due to the increase in the number of times users need to manipulate currently running apparatuses to turn off the apparatuses.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a control device which controls the power of a plurality of apparatuses in a home network, and a method thereof.

According to an aspect of the present invention, there is provided a control device which controls a plurality of apparatuses in a home network, the control device comprising an input unit which receives a power off command; and a control unit which concurrently turns off apparatuses which are currently turned on among the plurality of apparatuses, if the power off command is received via the input unit.

If a power on code and a power off code are used to control the power of the plurality of apparatuses, the control unit may concurrently transmit the power off code to the plurality of apparatuses.

The control device may further comprise a state monitoring unit which monitors the power state of the plurality of apparatuses. If a single code is used to control the power of the plurality of apparatuses, the control unit may transmit a power control code to only a currently running apparatus among the plurality of apparatuses based on the monitored power state of the plurality of apparatuses.

The state monitoring unit may receive power state information directly from the plurality of apparatuses, and may determine the power state of the plurality of apparatuses.

The state monitoring unit may receive power state information indirectly from one of the plurality of apparatuses, and may determine the power state of the plurality of apparatuses.

If at least one response is received from at least one apparatus of the plurality of apparatuses within a predetermined period of time after queries are transmitted to the plurality of apparatuses in the home network, the state monitoring unit may determine that the at least one apparatus is currently turned on.

According to another aspect of the present invention, there is provided a method by which a control device controls a plurality of apparatuses in a home network, the method comprising receiving a power off command; and concurrently turning off apparatuses which are currently turned on among the plurality of apparatuses, if the power off command is received.

The concurrently turning off may comprise, if a power on code and a power off code are used to control the power of the plurality of apparatuses, concurrently transmitting the power off code to the plurality of apparatuses.

The method may further comprise monitoring the power state of the plurality of apparatuses. The concurrently turning off may comprise, if a single code is used to control the power of the plurality of apparatuses, transmitting a power control code to only a currently running apparatus among the plurality of apparatuses based on the monitored power state of the plurality of apparatuses.

The monitoring may comprise receiving power state information directly from the plurality of apparatuses, and determining the power state of the plurality of apparatuses.

The monitoring may comprise receiving power state information indirectly from one of the plurality of apparatuses, and determining the power state of the plurality of apparatuses.

The monitoring may comprise, if at least one response is received from at least one apparatus of the plurality of apparatuses within a predetermined period of time after queries are transmitted to the plurality of apparatuses in the home network, determining that the at least one apparatus is currently turned on.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Figure 1:
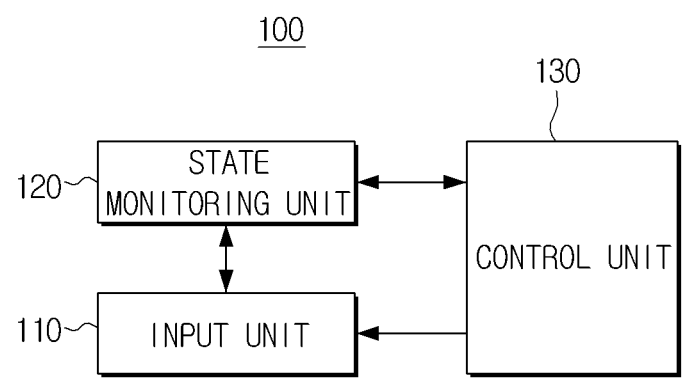
FIG. 1 is a block diagram of a control device according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a block diagram of a control device 100 according to an exemplary embodiment of the present invention. The control device 100 of FIG. 1 comprises an input unit 110, a state monitoring unit 120 and a control unit 130. The control device 100 may be implemented as a digital television (DTV) or a remote controller.

For example, if the control device 100 is implemented as a remote controller, the remote controller may communicate bi-directionally with a plurality of apparatuses within a home network to receive power control information directly from each of the plurality of apparatuses, and may control each of the plurality of apparatuses directly. Here, bi-directional communication covers may include all existing communication technologies, such as Bluetooth (BT), radio frequencies (RF), Wireless Fidelity (Wi-Fi), High Definition Multimedia Interface (HDMI)-Consumer Electronics Control (CEC) or wireless HDMI-CEC, as well as bi-directional communication technologies which may be developed in the future.

Alternatively, if the control device 100 is implemented as a remote controller which controls a DTV capable of controlling a plurality of apparatuses, the remote controller may be connected to the plurality of apparatuses indirectly via the DTV, which functions as a server. In other words, the remote controller may control the DTV, so as to control the power of the plurality of apparatuses connected to the DTV.

Additionally, if the control device 100 is implemented as a certain apparatus in a home network, for example a DTV, the DTV may bi-directionally communicate with other apparatuses connected thereto over the home network, and may control the power of the other apparatuses.

Here, the plurality of apparatuses may include a TV, a set-top box (STB), a home theater system (HTS), a Blu-ray disc player (BDP), a digital video disk player (DVDP), a hard disc drive recorder (HDDR), a portable multimedia player (PMP), or other apparatuses capable of being connected over the home network. The BDP is a high-density optical disc player capable of recording a disc with a capacity of tens of gigabytes (GB) or greater.

The input unit 110 receives a power off command input by a user. The power off command refers to a command to concurrently turn off currently running apparatuses, rather than a command to individually turn off each of the currently running apparatuses. The input unit 110 may comprise a button used only to turn off the currently running apparatuses concurrently.

Additionally, if a user presses a button or buttons in a general remote controller or in a DTV in some particular manner, the input unit 110 may determine that a command to turn off all of the currently running apparatuses has been received. For example, if a user presses a certain function button, and then presses a power button, or if a user continues to press a power button a plurality of times during a short period of time, or if a user depresses a power button for a predetermined period of time or longer, the input unit 110 may determine that the user enters the power off command to turn off all of the currently running apparatuses. The power off command may be input in various manners other than those described above.

The state monitoring unit 120 monitors the power state of the plurality of apparatuses in the home network. In more detail, the state monitoring unit 120 requests power state information from the plurality of apparatuses, with which the state monitoring unit 120 is able to bi-directionally communicate over the home network, and then monitors the power state of apparatuses currently connected over the home network using the power state information received as a result of the request. In this situation, the state monitoring unit 120 may determine that an apparatus which does not transmit its power state information to the state monitoring unit 120 among the plurality of apparatuses is currently turned off. Here, the power state information received from the plurality of apparatuses may comprise identification (ID) information and power off code information associated with each of the plurality of apparatuses. Additionally, the power state information may be transmitted in the form of a profile, or may be implemented as a query or response having no additional information.

The control unit 130 controls currently running apparatuses to be concurrently turned off, if the power off command is received. Specifically, if a power on code and a power off code cause the plurality of apparatuses in the home network to be turned on and off, respectively, the control unit 130 may concurrently transmit the power off code to the plurality of apparatuses in the home network, to control all the apparatuses currently running on the home network to be turned off.

Alternatively, if only a single code is used to control the power of the plurality of apparatuses in the home network, the control unit 130 may transmit a power control code only to a currently running apparatus based on the power state information monitored by the state monitoring unit 120, to control all the apparatuses currently running on the home network to be turned off.

While the currently running apparatuses are turned off concurrently in the exemplary embodiment of the present invention, as described above, the present invention is also applicable to a situation in which a user desires to concurrently turn on apparatuses which are not currently running. For example, if a user desires to watch a DVD, a DVDP, DTV and HTS may be turned on concurrently in response to a DVD power on command input by the user. This turning-on operation may be performed in a similar manner to the turning-off operation described above, so no further description is required.

Figure 2:
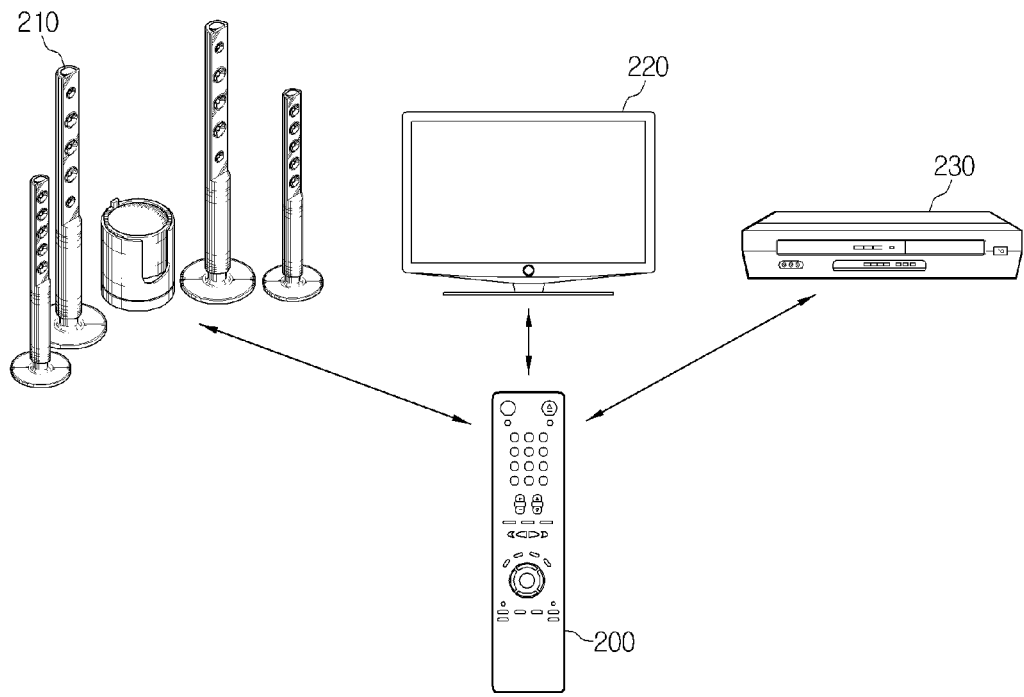
FIGS. 2 and 3 exemplarily illustrate examples of home network systems comprising the control device shown in FIG. 1.
Figure 3:
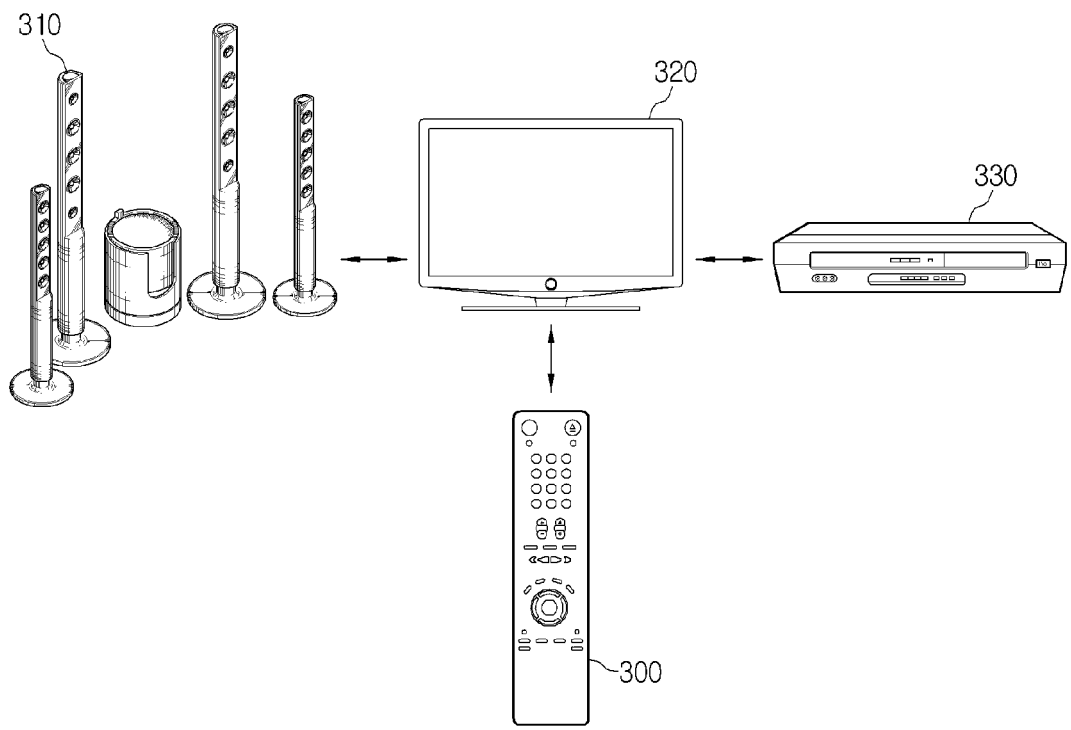

FIGS. 2 and 3 exemplarily illustrate home network systems comprising the control device 100 shown in FIG. 1. Hereinafter, it is assumed that a single power code is able to control the power of the plurality of apparatuses in the home network.

In a home network system shown in FIG. 2, a remote controller 200 used as the control device 100 of FIG. 1 may bi-directionally communicate with the plurality of apparatuses over the home network, namely an HTS 210, a TV 220 and a BDP 230. Accordingly, if the power off command is received, the remote controller 200 may receive power state information associated with the HTS 210, the TV 220 and the BDP 230 directly from the HTS 210, the TV 220 and the BDP 230, may transmit a power off code to the HTS 210, the TV 220 and the BDP 230 based on the received power state information, and may control one or more currently running apparatuses among the HTS 210, the TV 220 and the BDP 230 to be turned off.

In a home network system shown in FIG. 3, a remote controller 300 or a TV 320 may be used as the control device 100 of FIG. 1. Here, the TV 320 is able to communicate bi-directionally with apparatuses other than the TV 320 on the home network, namely an HTS 310 and a BDP 330.

If the remote controller 300 functions as the control device 100, the TV 320 may collect power state information associated with the HTS 310 and the BDP 330 from the HTS 310 and the BDP 330, and may transmit the collected power state information to the remote controller 300. The remote controller 300 may then transmit a power off code to the HTS 310 and the BDP 330 based on the power state information received from the TV 320, and may control currently running apparatuses to be turned off. In this situation, the remote controller 300 may transmit the power off code to the HTS 310 and BDP 330 directly, or indirectly via the TV 320.

Alternatively, if the TV 320 is used as the control device 100, the remote controller 300 performs only a function of transferring user control commands. The TV 320 may receive the power state information associated with the HTS 310 and the BDP 330 from the HTS 310 and the BDP 330, may transmit a power off code to the HTS 310 and the BDP 330 based on the received power state information, and may control currently running apparatuses to be turned off.

While three apparatuses are connected on the home network in the exemplary embodiment of the present invention, there is no limitation to the number of apparatuses capable of being connected to the home network. Additionally, the home network systems shown in FIGS. 2 and 3 have been provided to explain the relationship between the apparatuses and control device over the home network, so no further detailed illustration or description of the remote controller is required.

Figure 4:
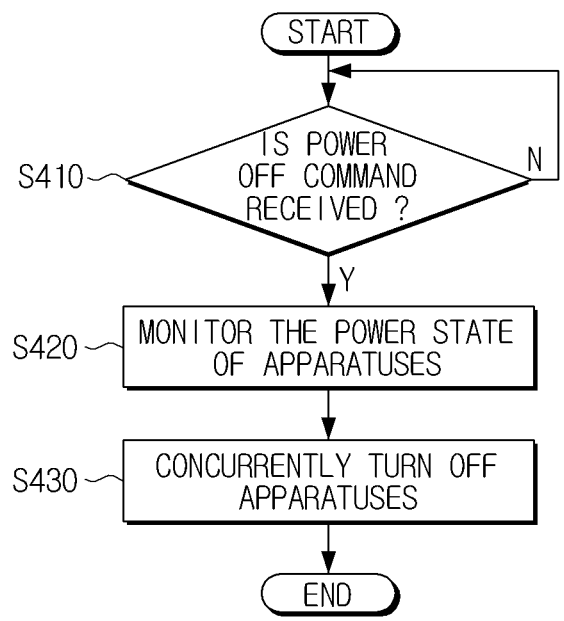
FIG. 4 is a flowchart illustrating a control method of a control device according to an exemplary embodiment of the present invention.

FIG. 4 is a flowchart illustrating a control method of the control device 100 shown in FIG. 1 according to an exemplary embodiment of the present invention.

In FIG. 4, if the power off command input by the user is received (S410—Y), the control device 100 may check the power state of the plurality of apparatuses in the home network (S420). In more detail, if a single code is used to control the power of the plurality of apparatuses in the home network, the control device 100 requests the power state information from the plurality of apparatuses, and then monitors the power state of the plurality of apparatuses currently connected over the home network using the power state information received as a result of the request. Here, the received power state information may comprise ID information and power control code information associated with each of the plurality of apparatuses.

Alternatively, if the power on code and power off code are used to control the power of the plurality of apparatuses in the home network, there is no need for the control device 100 to monitor the power state of the plurality of apparatuses within the home network.

Subsequently, the control device 100 controls the plurality of apparatuses to be concurrently turned off according to the monitored power state of the plurality of apparatuses (S430). In more detail, the control device 100 identifies currently running apparatuses among the plurality of apparatuses using the received power state information, and transmits a power off code to the currently running apparatuses, to concurrently turn off all of the currently running apparatuses in the home network. Accordingly, it is possible for a user to turn off all of the currently running apparatuses using a single power control button, so user convenience can increase.

As described above, according to the exemplary embodiments of the present invention, a user can concurrently turn off a plurality of currently running apparatuses using only a single button, so it is possible to improve user convenience.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A device comprising:
   a communication unit configured to receive power state information of each of a plurality of apparatuses in a home network, to transmit the received power state information to an external device, and to receive a power off command from the external device; and
   a controller configured to, in response to the power off command received from the external device, control the communication unit to transmit a command to turn off apparatuses which are currently turned on in response to the transmitted command, among the plurality of apparatuses.

2. The device of claim 1, wherein the power state information of each of the plurality of apparatuses comprises identification information and power control information associated with each of the plurality of apparatuses.

3. The device of claim 1, wherein a single power control information is used to control power of the plurality of apparatuses, and the controller is configured to control the communication unit to transmit the power control information to only the apparatuses which are currently turned on, among the plurality of apparatuses, to control all the apparatuses which are currently turned on to be turned off.

4. The device of claim 1, wherein the controller is further configured to confirm that at least one apparatus is currently turned on, if at least one response is received from the at least one apparatus of the plurality of apparatuses within a predetermined period of time after queries are transmitted to the plurality of apparatuses.

5. A method of controlling a plurality of apparatuses in a home network, the method comprising:
   receiving, by a device, power state information of each of a plurality of apparatuses in a home network;
   transmitting, from the device, the received power state information to an external device;
   receiving, by the device, a power off command from the external device; and
   transmitting, from the device, a command to turn off apparatuses which are currently turned on in response to the transmitted command, among the plurality of apparatuses, in response to receiving the power off command.

6. The method of claim 5, wherein the power state information of each of the plurality of apparatuses comprises identification information and power control information associated with each of the plurality of apparatuses.

7. The method of claim 6, wherein a single power control information is used to control power of the plurality of apparatuses, and
   wherein the method further comprises transmitting, from the device, the power control information to only the apparatuses which are determined to be currently turned on, among the plurality of apparatuses, to control all the apparatuses which are currently turned on to be turned off.

8. The method of claim 5, wherein the receiving the power state information comprises, if at least one response is received from the at least one apparatus of the plurality of apparatuses within a predetermined period of time after queries are transmitted to the plurality of apparatuses, confirming that the at least one apparatus is currently turned on.

9. A non-transitory computer-readable recording medium having recorded thereon a program which causes a device to execute a method of controlling a plurality of apparatuses in a home network, the method comprising:
   receiving, by a device, power state information of each of a plurality of apparatuses in a home network;
   transmitting, from the device, the received power state information to an external device;
   receiving, by the device, a power off command from the external device; and
   transmitting, from the device, a command to turn off apparatuses which are currently turned on in response to the transmitted command, among the plurality of apparatuses, in response to receiving the power off command.

10. The non-transitory computer-readable recording medium of claim 9, wherein the power state information of each of the plurality of apparatuses comprises identification information and power control information associated with each of the plurality of apparatuses.

11. The non-transitory computer-readable recording medium of claim 9, wherein a single power control information is used to control power of the plurality of apparatuses, and
   wherein the method further comprises transmitting, from the device, the power control information to only the apparatuses which are determined to be currently turned on, among the plurality of apparatuses, to control all the apparatuses which are currently turned on to be turned off.

12. The non-transitory computer-readable recording medium of claim 9, wherein the receiving power state information comprises, if at least one response is received from the at least one apparatus of the plurality of apparatuses within a predetermined period of time after queries are transmitted to the plurality of apparatuses, confirming that the at least one apparatus is currently turned on.

13. A system comprising:
   a device configured to be communicably connected to a plurality of apparatuses; and
   a control device configured to control the plurality of apparatuses via the device,
   wherein the device is further configured to receive power state information of each of the plurality of apparatuses in a home network, to transmit the received power state information to the control device, to receive a power off command from the external device, and in response to the power off command received from the external apparatus, to transmit a command to turn off apparatuses which are currently turned on in response to the transmitted command among the plurality of apparatuses,
   wherein the control device is further configured to receive the power state information from the device, determine which apparatuses among the plurality of apparatuses are currently turned on based on the power state information, and transmit the power off command to the device in response to a single user input being received.

* * * * *